(12) United States Patent
Orellano et al.

(10) Patent No.: US 9,481,377 B2
(45) Date of Patent: Nov. 1, 2016

(54) VEHICLE HEAD

(75) Inventors: Alexander Orellano, Berlin (DE); Martin Schober, Berlin (DE); Andreas Tietze, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 394 days.

(21) Appl. No.: 13/821,781

(22) PCT Filed: Sep. 7, 2011

(86) PCT No.: PCT/EP2011/065497
§ 371 (c)(1),
(2), (4) Date: May 24, 2013

(87) PCT Pub. No.: WO2012/032094
PCT Pub. Date: Mar. 15, 2012

(65) Prior Publication Data
US 2013/0291758 A1 Nov. 7, 2013

(30) Foreign Application Priority Data

Sep. 10, 2010 (DE) .......................... 10 2010 044 933
Sep. 21, 2010 (EP) ..................................... 10178108

(51) Int. Cl.
*B61D 17/02* (2006.01)

(52) U.S. Cl.
CPC ............ *B61D 17/02* (2013.01); *B60L 2200/26* (2013.01); *Y02T 30/32* (2013.01)

(58) Field of Classification Search
CPC .... B61D 17/02; Y02T 30/32; B60L 2200/26
USPC ............... 105/1.1, 1.2, 1.3; 296/180.5, 181.5
See application file for complete search history.

(56) References Cited

U.S. PATENT DOCUMENTS

| 2,642,816 A | * | 6/1953 | Sbrighi .......................... 105/1.3 |
| 2,955,869 A | * | 10/1960 | Blaser .................... B62D 35/00 296/181.5 |
| 3,730,103 A | * | 5/1973 | Weaver ................... B61B 13/04 104/119 |
| 4,770,457 A | * | 9/1988 | Tomforde ............ B62D 35/005 293/117 |

FOREIGN PATENT DOCUMENTS

| CN | 101624058 A | 1/2010 |
| DE | 10109831 A1 | 8/2002 |
| EP | 2106983 A2 | 10/2009 |
| FR | 2675760 A1 | 10/1992 |
| JP | 2006273294 A | 10/2006 |

* cited by examiner

*Primary Examiner* — Mark Le
(74) *Attorney, Agent, or Firm* — The Webb Law Firm

(57) ABSTRACT

A superstructure module of a front-end section of a vehicle is supported on a chassis and includes a flow guiding device. The front-end section forms a leading, free vehicle end during normal operation of the vehicle. The flow guiding device is mounted on a lower side of the superstructure in the longitudinal direction of the vehicle between the free vehicle end and a leading end of a chassis. The flow guiding device influences air flow that flows during operation of the vehicle along the lower side of the superstructure from the free vehicle end to the chassis section. The flow guiding device via a deflection area confers on the air flow, in the region of a flow separation edge at the leading end of the chassis section, a downwardly directed direction of flow.

19 Claims, 5 Drawing Sheets

VEHICLE HEAD

CROSS-REFERENCE TO RELATED APPLICATIONS

This application is the United States national phase of International Application No. PCT/EP2011/065497, filed Sep. 7, 2011, and claims priority to German Patent Application No. 10 2010 044 933.4, filed Sep. 10, 2010 and European Patent Application No. 10178108.6, filed on Sep. 21, 2010.

BACKGROUND OF THE INVENTION

1. Field of the Invention

The present invention relates to a wagon body module having a flow guiding device, the wagon body module serving to form at least a portion of a head portion of a wagon body of a vehicle supported on at least one running gear, in particular a rail vehicle for high-speed traffic, the wagon body defining a vehicle longitudinal direction, a vehicle transverse direction and a vehicle height direction. The head portion is configured to form a leading free vehicle end during normal operation of the vehicle. The flow guiding device is itself configured to be arranged at a lower side of the wagon body in the vehicle longitudinal direction between the free vehicle end and a leading end of a running gear cutout of the wagon body, the running gear cutout receiving the running gear associated with the free vehicle end. The flow guiding device is configured to influence, during operation of the vehicle, an air flow which flows over the lower side of the wagon body from the free vehicle end towards the running gear cutout. The invention further relates to a wagon body and a vehicle having such a wagon body module.

2. Description of Related Art

In modern rail vehicles having comparatively high nominal operating speeds, there is generally the problem that considerable noise emissions occur at the vehicle head in the region of the leading running gear cutout particularly at high speeds. This is, since inter alia the flow in the region of a leading flow separation edge becomes detached from the outer skin of the wagon body at the ingress into the running gear cutout, a continuously expanding shear layer resulting within the subsequent flow path. Generally, in that shear layer, periodic formation of turbulence (so-called Kelvin-Helmholtz-Instability) and the associated noise emission occurs. Another problem involves the comparatively hard impact of the shear layer on following vehicle components, in particular the impact on the wall at the trailing end of the running gear cutout which also contributes significantly to the noise emission.

The unfavourable flow relationships described further increase the aerodynamic resistance of the entire vehicle and the flow loads on the track bed which may result in objects being thrown up from the track bed (for example, so-called flying ballast).

The document EP 2 106 983 A2, in the context of a generic wagon body module, proposes providing, in the region of the flow separation edge at the leading end of the running gear cutout, turbulators which are distributed in the vehicle transverse direction and which are intended to serve to introduce a plurality of relatively small vortices in the shear layer in order to suppress at least substantially the periodic formation of the above-described vortex. The turbulators can be formed both by a heavily roughened surface and by comparatively greatly pronounced crenellated projections orientated in the vehicle longitudinal direction in the outer skin of the wagon body. The crenellated projections can themselves in turn be formed by prismatic elements positioned on the outer skin or corresponding notches in the outer skin of the wagon body.

Although this configuration allows the formation of periodic vortices and the associated noise emission to be reduced by the turbulence in the shear layer being increased, the configuration described involves the disadvantage that the shear layer expands comparatively quickly or powerfully in the vehicle height direction so that a comparatively large impact surface of the shear layer on trailing vehicle components (such as the running gear or the trailing delimiting wall of the running gear cutout) results with the associated noise emission being amplified accordingly. On the other hand, a shear layer which is strongly expanded in that manner naturally increases the flow resistance of the vehicle, sometimes substantially.

Therefore, an object of the present invention is to provide a wagon body module of the type mentioned in the introduction which does not involve the above-mentioned disadvantages, or at least involves them to a lesser extent, and which particularly allows the noise emission of the vehicle to be reduced in a simple way.

SUMMARY OF THE INVENTION

The present invention is based on the technical teaching that a reduction of the noise emission of the vehicle in the region of the running gear cutout is readily achieved if the flow guiding device imposes a downwardly directed main flow direction upon the air flow in the region of a flow separation edge at the leading end of the running gear cutout by means of a deflection region. That downward deflection of the flow has the advantage that the shear layer being formed can be directed at least partially around the adjacent vehicle components so that, if at all, only a smaller portion of the shear layer still strikes those components and produces corresponding noise emissions in this instance. The deflection of the main flow direction of the flow downwards is selected to be sufficiently large to achieve the state that preferably only a maximum of 40% of the shear layer still strikes the running gear or the trailing end of the running gear cutout. Preferably the main flow direction is inclined by at least 3° relative to the vehicle longitudinal direction. It is thereby possible to achieve particularly favourable effects with regard to the reduction in the noise emission.

According to one aspect, the present invention therefore relates to a wagon body module for forming at least a portion of a head portion of a wagon body of a vehicle supported on at least one running gear, in particular a rail vehicle for high-speed traffic, having a flow guiding device, the wagon body defining a vehicle longitudinal direction, a vehicle transverse direction and a vehicle height direction. The head portion is configured to form a leading free vehicle end during normal operation of the vehicle. The flow guiding device is configured to be arranged at a lower side of the wagon body in the vehicle longitudinal direction between the free vehicle end and a leading end of a running gear cutout of the wagon body, which cutout receives the running gear associated with the free vehicle end. The flow guiding device is further configured to influence, during operation of the vehicle, an air flow which flows over the lower side of the wagon body from the free vehicle end towards the running gear cutout. Finally, the flow guiding device is configured to impose upon the air flow in the region of a flow separation edge at the leading end of the running gear cutout, by means of a deflection region, a downwardly directed main flow direction which is inclined relative to the vehicle longitudinal direction by at least 3°, preferably at least 4°, more preferably at least 6°, typically from 3° to 30°.

In principle, the downward deflection of the main flow direction may be selected to be of any magnitude. However, it is particularly advantageous if the flow is not deflected too far downwards in the direction of the track bed in order to avoid as much as possible unfavourable effects such as, for example, an increase in the flow resistance, the production of flying ballast, etc. Therefore, the main flow direction is preferably inclined relative to the vehicle longitudinal direction by 3° to 30°, preferably by 5° to 20°, more preferably by 7° to 15°, more preferably by 4° to 8°, more preferably by 5° to 7°, in particular by 6° to 9°.

In principle, the deflection region, in the vehicle transverse direction, may further extend over any sufficiently large portion of the wagon body. The deflection region preferably extends in the vehicle transverse direction over at least 60%, preferably over at least 80%, more preferably over at least 100%, more preferably over at least 120% of a wheel gauge of the running gear, whereby a particularly favourable, high reduction in the noise emissions can be achieved.

The deflection region is generally a coherent region which is preferably arranged centrally in the vehicle transverse direction. However, it will be understood that the deflection region may optionally also be formed from a plurality of mutually separate portions in which the downward deflection of the main flow direction is achieved within the limits described above.

The downward deflection of the flow is brought about by means of a guiding portion of the flow guiding device adjacent to the flow separation edge. In order to achieve the downward deflection, the guiding portion is constructed in such a manner that it reduces, in the vehicle height direction, a free flow cross-section available for the air flow in the direction towards the flow separation edge. In principle, the dimensions of the guiding portion in the vehicle longitudinal direction may be selected freely as long as there is brought about a sufficiently strong or lasting influence on the flow which ensures a main flow direction which is accordingly inclined downwards after the flow separation edge.

If the flow separation edge is arranged so as to be spaced from the free vehicle end in the vehicle longitudinal direction by a separation edge distance, the guiding portion, in preferred variants of the wagon body module according to the invention, extends in the vehicle longitudinal direction over at least 10%, preferably over at least 20%, more preferably over 10% to 30%, of the separation edge distance. It is thereby possible to achieve a particularly favourable, lasting influence on the flow.

Whilst, in preferred variants of the invention, the flow guiding surface which co-operates with the air flow is constructed as a substantially continuous smooth surface, it will be understood that this does not necessarily have to be the case. Instead, the flow guiding surface may deviate to a greater or lesser extent from such a continuous and smooth surface, for example, may be provided with projections, recesses, local interruptions (with regular or irregular distribution), etc. The decisive aspect is simply that the flow guiding surface is constructed in such a manner that it defines an envelope the course of which brings about the desired strong or lasting influence on the flow.

In preferred variants of the invention, a tangent to the envelope in the region of the guiding surface, in a sectional plane extending perpendicularly to the vehicle transverse direction, is inclined relative to the vehicle longitudinal direction by at least a first angle of inclination of at least 3°, preferably from 3° to 10°, more preferably from 3° to 8°, more preferably from 3° to 6°. A particularly favourable downward deflection of the flow is thereby achieved. Preferably, the first angle of inclination increases in the direction towards the flow separation edge, since a particularly favourable influence on the flow can thereby be achieved.

In the vehicle transverse direction, the guiding portion preferably extends over a sufficiently wide portion to achieve the deflection of a quantity of air which is sufficiently large for the desired reduction of the noise emission. The guiding portion preferably extends in the vehicle transverse direction over at least 80%, preferably over at least 100%, more preferably over at least from 110% to 120% of a wheel gauge of the running gear.

The flow separation edge may be formed at a given spacing from the guiding portion, for example, on a separate component. However, preferably, the guiding portion itself forms the flow separation edge. The flow separation edge may again have any suitable course (at least partially linear and/or at least partially curved). In variants of the invention having a particularly simple structure, the flow separation edge is constructed in a substantially linear manner.

Furthermore, in principle, the guiding surface may have an arbitrary course. Thus, for example, it may be constructed at least partially as a simple planar face having a linear sectional contour (in a plane perpendicular to the vehicle transverse direction). Additionally or alternatively, however, it may also at least section-wise have a configuration which is singularly or multiply curved. In particular, the guiding portion may have a substantially cylindrical guiding surface or a substantially ellipsoid guiding surface or a substantially hyperboloid guiding surface.

Furthermore, the guiding surface may have a substantially convex first sectional contour in a sectional plane perpendicular to the vehicle longitudinal direction and may have a substantially concave second sectional contour in a sectional plane perpendicular to the vehicle transverse direction. It is thereby possible to bring about particularly favourable adaptation to the geometry of vehicles for high-speed traffic, which taper greatly in the direction towards the vehicle front.

In particular in high-speed traffic, in an area that is as close to the vehicle tip as possible, it is desirable to extend the wagon body downwards towards the construction limit envelope as far as possible, this envelope being predetermined for the routes to be travelled by the vehicle. In particular in the region of the longitudinal centre plane, this lowering of the nose tip is preferably more pronounced than at a more lateral location. It is thereby generally intended to achieve that as large a portion of the incoming air as possible is displaced laterally and therefore does not pass under the vehicle where, due to the rugged configuration in the running gear region, it may result in the acoustic problems described above. Another advantage of this approach is the reduction of the aerodynamic resistance of the vehicle and the reduction of the aerodynamic loads imposed on the track. Those aerodynamic loads on the track may result in so-called flying ballast, in which objects in the track bed, such as inter alia the ballast used, become agitated and can damage both the vehicle and the environment (infrastructure or, in the worst case, even passers-by).

In preferred variants of the invention, that advantageous configuration of an outer skin of the wagon body which extends as close as possible to the construction limit envelope is combined in a particularly advantageous manner with the downward deflection of the flow according to the invention by the flow guiding device having a diffuser portion which is located upstream of the guiding portion and which extends between the free vehicle end and the guiding portion and which increases, in the vehicle height direction, a free flow cross-section available for the air flow towards the flow separation edge.

That expansion of the flow cross-section obtained by means of the diffuser portion allows the flow passing under the vehicle initially to be directed upwards over the diffuser portion in order subsequently to be able to direct it downwards again by means of the guiding portion, whereby the desired deflection of the shear layer behind the flow separation edge is achieved. It is thereby, in particular, possible to extend both the outer skin located in front of the diffuser portion at the vehicle tip as well as the flow separation edge directly up to the construction limit envelope and, consequently, to reduce the air quantity which even reaches the region of the running gear cutout.

The diffuser portion may also be of any suitable length as long as the above-described guiding function is achieved. The diffuser portion preferably extends, in the vehicle longitudinal direction, over at least 15%, preferably over at least 25%, more preferably over 15% to 45%, of the separation edge distance, since particularly advantageous guiding behaviour can thereby be achieved.

With regard to the construction of the diffuser surface of the diffuser portion co-operating with the air flow, in principle the same statements as those made above for the guiding surface apply. The diffuser surface is preferably constructed in such a manner that a tangent to the envelope, in the region of the diffuser surface in a sectional plane which extends perpendicularly relative to the vehicle transverse direction, is inclined relative to the vehicle longitudinal direction by a first angle of inclination of at least 1°, preferably from 2° to 7°, more preferably from 3° to 5°.

Any suitable extent of the diffuser portion may again also be provided in the vehicle transverse direction. Widths of the diffuser of over 120% of the wheel gauge can be provided particularly if the front end is constructed so as to be correspondingly wide. The diffuser portion preferably extends in the vehicle transverse direction over at least 20%, preferably over at least 30%, more preferably over 20% to 40%, of a wheel gauge of the running gear, since a particularly advantageous construction is thereby achieved.

The diffuser portion also preferably has a substantially smooth surface. Furthermore, the diffuser portion also preferably has a surface which is curved at least singularly, in particular a substantially cylindrical surface, or a surface which is curved twice, in particular a substantially ellipsoid or hyperboloid surface.

A construction which is advantageous with regard to the unimpeded guiding of the flow is produced if the diffuser portion has a diffuser surface which has a substantially convex third sectional contour in a sectional plane perpendicular to the vehicle longitudinal direction and has a fourth sectional contour having a point of inflection in a sectional plane perpendicular to the vehicle transverse direction.

Preferred constructions have a transition portion of the flow guiding device between the diffuser portion and the guiding portion, in the region of which transition portion a tangent to the envelope in a sectional plane which extends perpendicularly relative to the vehicle transverse direction changes, particularly continuously, its inclination relative to the vehicle longitudinal direction. Additionally or alternatively, an introductory portion of the flow guiding device which is located upstream of the diffuser portion may be provided, in the region of which introductory portion a tangent to the envelope in a sectional plane which extends perpendicularly relative to the vehicle transverse direction changes, particularly continuously, its inclination relative to the vehicle longitudinal direction towards a value of zero. Both portions are advantageous with regard to the unimpeded guiding of the flow.

If the already described construction limit envelope which the wagon body has to comply with is predetermined for the wagon body, there is preferably provided an introductory portion of the flow guiding device which is located upstream of the diffuser portion and which extends substantially as far as the construction limit envelope at least in the vehicle height direction in order to bring about lateral displacement of the incoming air which is as extensive as possible as described above.

In other advantageous constructions of the wagon body module according to the invention, the flow guiding device is constructed in order to form a slight indentation in an outer skin of the wagon body at the lower side of the wagon body between an introductory portion which is located upstream of the flow separation edge and the flow separation edge. In this instance, the flow guiding device has a flow guiding surface which co-operates with the air flow and which defines an envelope, the envelope, over a transverse region, having a substantially S-like sectional contour in a sectional plane extending perpendicularly relative to the vehicle transverse direction. It is thereby possible also to bring about the above-described advantageous guiding of the air flow under the vehicle.

The transverse region, in the vehicle transverse direction, preferably extends over at least 50%, preferably over at least 80%, more preferably over 100% of a wheel gauge of the running gear, since it is thereby possible to obtain a particularly favourable influence on a sufficiently large portion of the shear layer.

If the flow separation edge, in the vehicle longitudinal direction, is arranged so as to be spaced from the free vehicle end by a separation edge distance, the introductory portion, in the vehicle longitudinal direction, preferably additionally or alternatively, extends up to a distance from the free vehicle end that is 35% to 65% of the separation edge distance, preferably 40% to 60% of the separation edge distance, more preferably 45% to 55% of the separation edge distance distance.

If the described construction limit envelope which the wagon body has to comply with is again predetermined for the wagon body whilst the free vehicle end, in the vehicle height direction, has a maximum vehicle tip height (that is to say, the height of the front-most point of the head portion) above the construction limit envelope, the introductory portion, in the vehicle longitudinal direction, preferably additionally or alternatively, extends up to a distance from the free vehicle end that ranges from 150% to 300% of the vehicle tip height, preferably from 175% to 275% of the vehicle tip height, more preferably from 200% to 250% of the vehicle tip height. There is thereby obtained a construction which is optimised with regard to the extensive lateral displacement of the incoming air.

In preferred variants of the wagon body module according to the invention, the introductory portion, at least in the vehicle height direction, extends substantially as far as the construction limit envelope, as mentioned. Additionally or alternatively, the introductory portion may be provided in the region of a substantially dome-like projection at the lower side of the wagon body in order to achieve, in a particularly simple manner, early lateral displacement of the incoming air.

As already mentioned above, the flow separation edge is preferably constructed in a substantially linear manner. Additionally or alternatively, the flow separation edge may extend substantially up to the construction limit envelope at least in the vehicle height direction.

In preferred variants of the wagon body module according to the invention, in the region of the flow separation edge, there are provided a plurality of turbulator elements in order to introduce turbulence into the shear layer which is formed after a flow separation at the flow separation edge. The advantage described in the introduction involving the prevention of noise emissions by the periodic formation of vortices within the shear layer is thereby achieved. Another advantage involves the prevention of the periodic formation of pronounced vortices and the associated reduction or prevention of load peaks of the aerodynamic loads acting on the track. The problem of flying ballast already mentioned can thereby be effectively reduced.

The turbulator elements, in principle, may be constructed in any suitable manner. In particular, at least one of the turbulator elements may be constructed as a fin-like projection at the lower side of the wagon body. The turbulator element may have any orientation relative to the vehicle longitudinal direction. The turbulator element is preferably arranged so as to be inclined relative to the vehicle longitudinal direction. This has the advantage that the disruption which is thereby introduced into the shear layer can primarily act in the vehicle transverse direction, which produces longitudinal vortices which have an axis of rotation extending approximately in the vehicle longitudinal direction and which do not result in an undesirable increased expansion of the shear layer in the vehicle height direction caused by the turbulator elements.

At least one of the turbulator elements is preferably configured to divert the portion of the air flow striking it in the vehicle transverse direction away from a longitudinal centre plane of the wagon body, since a particularly favourable introduction of the turbulence into the shear layer is thereby achieved.

It should be mentioned at this point that an arrangement of the turbulator element which is inclined in that manner relative to the main flow direction and which does not involve any substantial expansion of the shear layer constitutes an independently patentable inventive concept which is independent of the deflection of the shear layer downwards.

The present invention further relates to a wagon body having a wagon body module according to the invention. The wagon body module according to the invention may be in the form of a separate module which can also be mounted on a wagon body subsequently. In this instance, it is particularly suitable as a retrofit solution for already existing vehicles which currently have a conventional configuration having a wagon body lower side which extends parallel with the vehicle longitudinal axis.

However, it will be understood that the wagon body module in other variants of the invention may also constitute, for example, a complete head module of a wagon body and optionally also the complete wagon body.

The present invention further relates to a wagon body for a vehicle, in particular a rail vehicle for high-speed traffic, having a head portion, a running gear cutout for receiving a running gear associated with the head portion and a flow guiding device, the head portion defining a vehicle longitudinal direction, a vehicle transverse direction and a vehicle height direction. The head portion is configured to form a leading free vehicle end during normal operation at a nominal operating speed of the vehicle. The running gear cutout has a leading end which is nearer the free vehicle end in the vehicle longitudinal direction than a trailing end of the running gear cutout.

The flow guiding device is arranged at a lower side of the wagon body between the free vehicle end and the leading end of the running gear cutout. The flow guiding device is configured to influence, during operation of the vehicle, an air flow which flows over the lower side of the wagon body from the free vehicle end towards the running gear cutout. The flow guiding device is further configured to impose a downwardly directed main flow direction to the air flow in the region of a flow separation edge at the leading end of the running gear cutout by means of a deflection region, the main flow direction being inclined downwards in such a manner that a shear layer forming after a flow separation at the flow separation edge, the local height extension of which increases in the vehicle height direction due to an expansion in the flow path, in particular at the nominal operating speed, strikes the running gear over a maximum of 40% to 50% of the local height extension, preferably a maximum of 20% of the local height extension, more preferably a maximum of 10% of the local height extension. Additionally or alternatively, the main flow direction is inclined downwards in such a manner that the shear layer strikes the trailing end of the running gear cutout over a maximum of 40% to 50% of the local height extension, preferably a maximum of 20% of the local height extension, more preferably a maximum of 10% of the local height extension. It is also thereby possible to achieve the above-described variants and advantages to the same extent so that reference is only made in this regard to the above explanations.

Finally, the present invention further relates to a vehicle having a wagon body according to the invention. This may be any vehicle having a nominal operating speed of any magnitude. The present invention may be used particularly advantageously in a vehicle for high-speed traffic having a nominal operating speed above 250 km/h, particularly above 300 km/h.

BRIEF DESCRIPTION OF THE DRAWINGS

Other preferred embodiments of the invention will become apparent from the dependent claims or the following description of preferred embodiments which makes reference to the appended drawings, in which:

DESCRIPTION OF THE INVENTION

Figure 1:
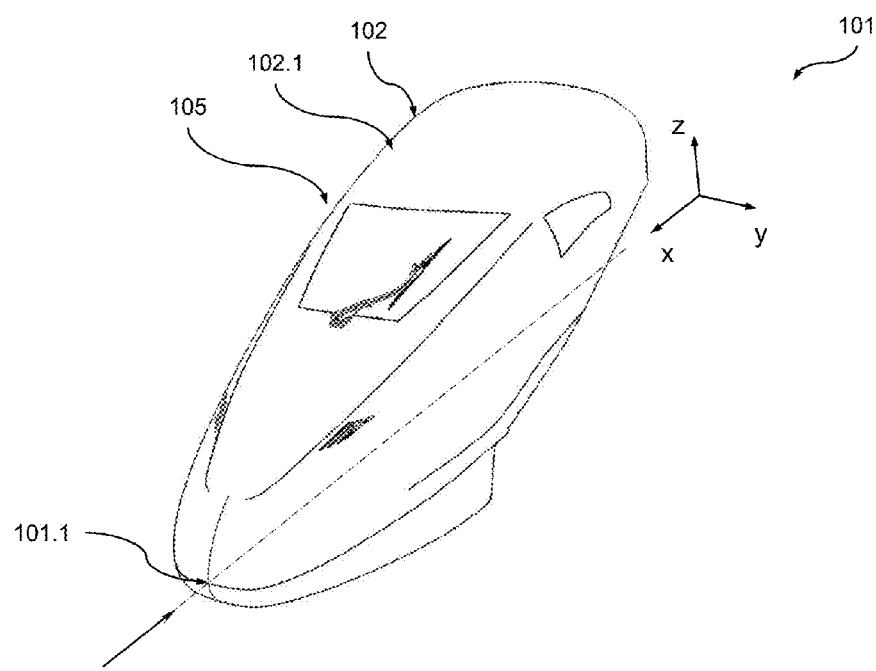
FIG. 1 is a schematic perspective view of a portion of a preferred embodiment of the vehicle according to the invention.
Figure 2:
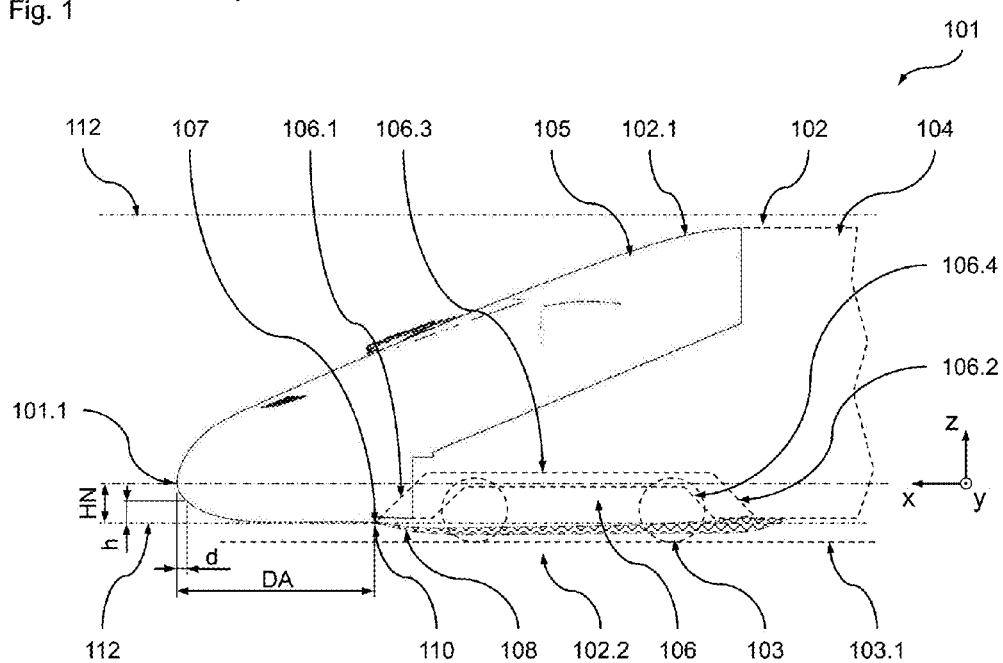
FIG. 2 is a schematic side view of the vehicle from FIG. 1.

With reference to FIGS. 1 to 12, a preferred embodiment of the vehicle according to the invention in the form of a rail vehicle 101 is described below. The rail vehicle 101 is an end car of a train set for high-speed traffic the nominal operating speed of which is above 250 km/h, namely at $v_n$=300 km/h.

It should be mentioned at this point that the following explanations are set out for a flow state during the travel of the vehicle 101 at a constant speed on a straight level track without influences from side wind or the like unless explicitly stated otherwise. It will be understood that deviations from the described flow conditions, in particular the flow directions, may result in the event of a deviation from that operating state (for example, as a result of travel in curves or side wind, etc.), but with the fundamental assertions substantially continuing to apply.

The vehicle 101 comprises a wagon body 102 which defines an outer skin 102.1 of the vehicle 101. The wagon body 102 is supported in the region of the two ends thereof in conventional manner on a running gear in the form of a bogie 103. However, it will be understood that the present invention may also be used in conjunction with other configurations, in which the wagon body is only supported on one running gear.

For better comprehension of the following explanations, there is set out in the Figures a vehicle coordinate system x, y, z (which is predetermined by the wheel contact plane 103.1 of the bogie 103) and in which the x coordinate denotes the longitudinal direction of the rail vehicle 101, the y coordinate denotes the transverse direction of the rail vehicle 101 and the z coordinate denotes the height direction of the rail vehicle 101.

The wagon body 102 has a body portion 104 and an adjoining preferred exemplary embodiment of the wagon body module according to the invention in the form of a head portion 105. The body portion 104 has (except for local cutouts for functional components of the vehicle such as, for example, current collectors, roof containers, etcetera) a substantially prismatic construction (with substantially identical sectional contours of the outer skin 102.1 in the vehicle longitudinal direction). In contrast, the head portion 105 tapers both in the vehicle height direction and in the vehicle transverse direction towards the end of the vehicle 101 so that it can form a free vehicle end of the vehicle 101 during operation of the vehicle 101. A compartment is provided in the head portion 105 for the vehicle driver, from which the vehicle driver controls the vehicle 101 if the head portion 105 forms the leading end 101.1 of the vehicle 101 during normal operation of the vehicle 101 (that is to say, the travel direction is orientated in the direction of the positive x axis, which is taken as a basis below unless explicitly stated otherwise).

The bogie 103 is arranged in a running gear cutout 106 of the wagon body 102 which is delimited at its leading end by a leading wall 106.1 and at its trailing end by a trailing wall 106.2, which are connected to each other by an upper wall 106.3. The running gear cutout 106 is delimited at both running gear sides by aprons 106.4.

The lower end of the leading wall 106.1, in this operating mode, forms a flow separation edge 107, at which the air flow (which flows over the lower side 102.2 of the wagon body 102 from the free vehicle end towards the running gear cutout 106) becomes detached from the outer skin 102.1 of the wagon body 102. The flow separation edge 107 is arranged so as to be spaced from the free vehicle end 101.1 in the vehicle longitudinal direction by a separation edge distance DA (see FIG. 2).

Figure 9:
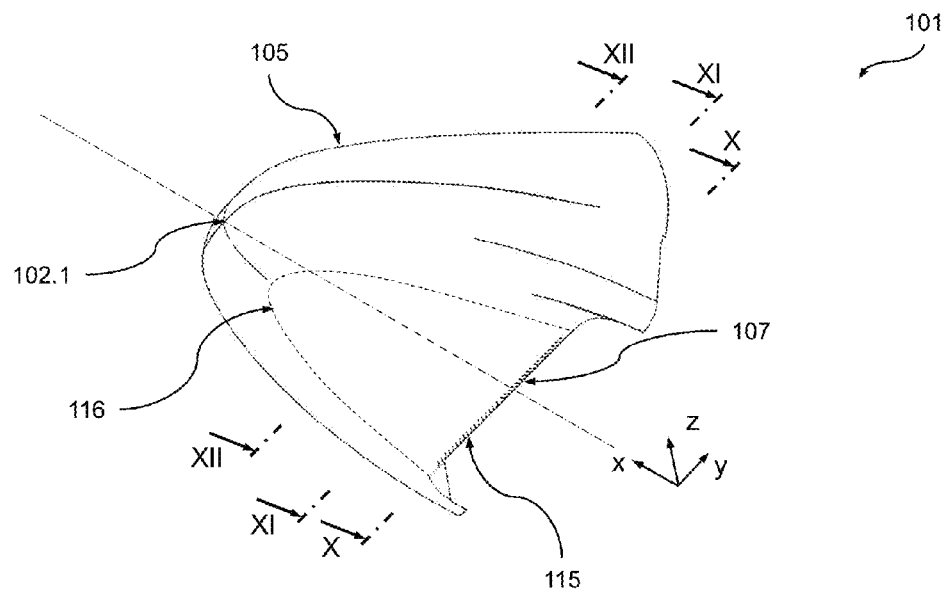
FIG. 9 is a schematic perspective view of the outer skin of the vehicle from FIG. 1 in the region of the vehicle front from below.
Figure 10:
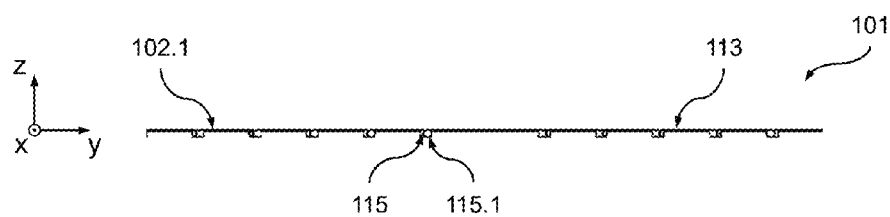
FIG. 10 is a schematic sectional view of a portion of the outer skin of the vehicle in the region of the vehicle front along line X-X from FIG. 9.
Figure 11:
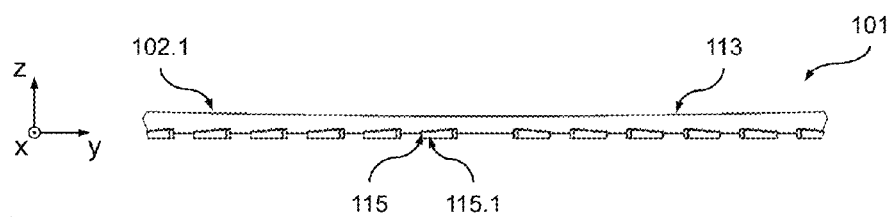
FIG. 11 is a schematic sectional view of a portion of the outer skin of the vehicle in the region of the vehicle front along line XI-XI from FIG. 9.
Figure 12:
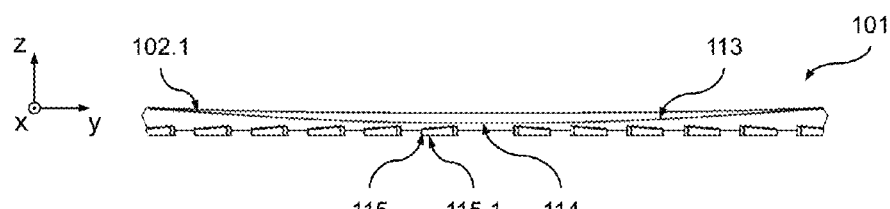
FIG. 12 is a schematic sectional view of a portion of the outer skin of the vehicle in the region of the vehicle front along line XII-XII from FIG. 9.

In the present example, the flow separation edge 107 is constructed in a substantially linear manner (see in particular FIG. 9). However, it will be understood that the flow separation edge, in other variants of the invention, may have any suitable extent (for example, at least partially linear and/or at least partially curved).

After the air flow becomes detached, a so-called shear layer 108 is formed as a result of the different flow speeds in the running gear cutout 106 and in the intermediate space located below towards the track bed. The flow conditions within the shear layer 108 are very unstable owing to the speed differences so that, in the subsequent flow path, a periodic formation of vortices occurs in addition to an expansion of the shear layer 108 in the vehicle height direction (z direction).

That periodic vortex formation, in conventional vehicles, causes a substantial noise emission in that vehicle region. This is further amplified by those vortices striking trailing vehicle components, in particular components of the bogie and the trailing wall of the running gear cutout. Those components are thereby excited to vibrate and therefore also to emit noise.

In order to reduce that noise emission, the head module 105 according to the invention, in the vehicle longitudinal direction between the free vehicle end 101.1 and the flow separation edge 107, has a flow guiding device 109 at the lower side thereof. The flow guiding device 109, in the region of the flow separation edge 107 over a deflection region 110, imposes to the air flow a downwardly directed main flow direction 111 which is inclined relative to the vehicle longitudinal direction by an angle $\alpha$=6° (see in particular FIG. 5), with angular deviations of up to ±1° being possible.

In other preferred variants of the invention, a downwardly directed main flow direction 111 is imposed to the air flow in the region of the flow separation edge 107 via a deflection region 110, that is inclined relative to the vehicle longitudinal direction by an angle $\alpha$=9° (see in particular FIG. 5), angular deviations of up to ±1° being possible.

As can be seen in FIGS. 5 to 8, the angular deflection of the main flow direction 111 in the deflection region 110 (with the tolerances mentioned) is $\alpha$=6° over the wheel gauge W. The deflection angle of the main flow direction 111 increases slightly to approximately 8° only in the edge region outside the wheel gauge. In the variant having the first angle $\alpha$=9°, the angle remains substantially constant over the width B.

It is thereby advantageously achieved that the shear layer 108 is also deflected downwards (see FIG. 2) and, consequently, if at all, strikes the bogie 103 at the nominal operating speed of the vehicle 101 over a maximum of 10% of its local height extension. In the subsequent flow path, it is thereby achieved that the shear layer 108 strikes the trailing wall 106.2 of the running gear cutout 106 over a maximum of 20% of its local height extension. Both effects bring about the mentioned reduction of the vibration excitation of those vehicle components and the noise emission which is thereby induced.

It will be understood that, in principle, the downward deflection of the main flow direction 111 may be selected to be of any size in order to achieve the effect described. In particular, the angle α can vary over the vehicle width (that is to say, in the vehicle transverse direction) in order to achieve a corresponding modulation or adaptation with regard to the subsequent vehicle components. However, it is particularly favourable if the flow is not deflected too far downwards in the direction of the track bed in order to avoid unfavourable effects to the greatest possible extent, such as, for example, an increase in the flow resistance, the production of flying ballast, etc.

Figure 3:
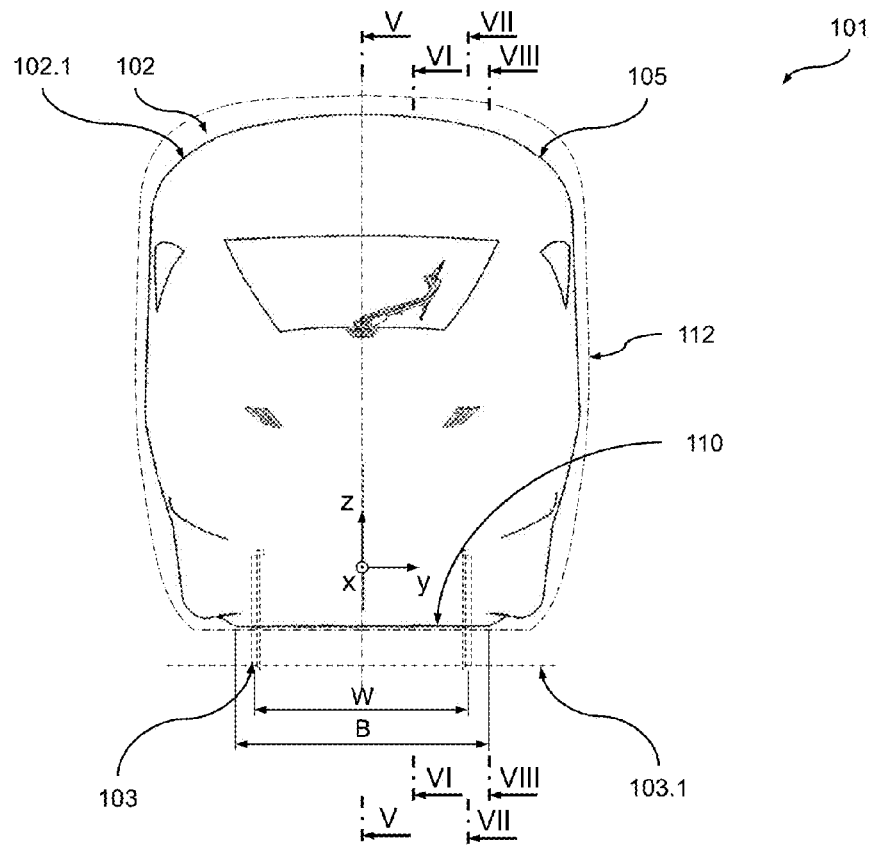
FIG. 3 is a schematic front view of the vehicle from FIG. 1.

The deflection region 110, in the vehicle transverse direction, extends over the entire width of the flow separation edge 107. As can be seen in FIG. 3, the flow separation edge 107 and the deflection region 110 extend over a width dimension B which substantially corresponds to 110% of the wheel gauge W of the bogie 103.

In this instance, it will be understood that the deflection region 110 in other variants of the invention may extend in principle in the vehicle transverse direction over any sufficiently large portion of the wagon body. The deflection according to the invention in the region of the vehicle centre is of particular significance. The deflection region, from the vehicle centre, preferably extends at both sides in the vehicle transverse direction over 20% to 40% of the wheel gauge W.

The downward deflection of the air flow is brought about by means of a guiding portion 109.1 of the flow guiding device 109 which forms the flow separation edge 107 and which, consequently, directly adjoins the flow separation edge 107. In order to achieve the downward deflection, the guiding portion 109.1 is constructed in such a manner that it reduces, in the vehicle height direction, a free flow cross-section available for the air flow towards the flow separation edge 107, as can be seen in particular in FIG. 4.

Figure 4:
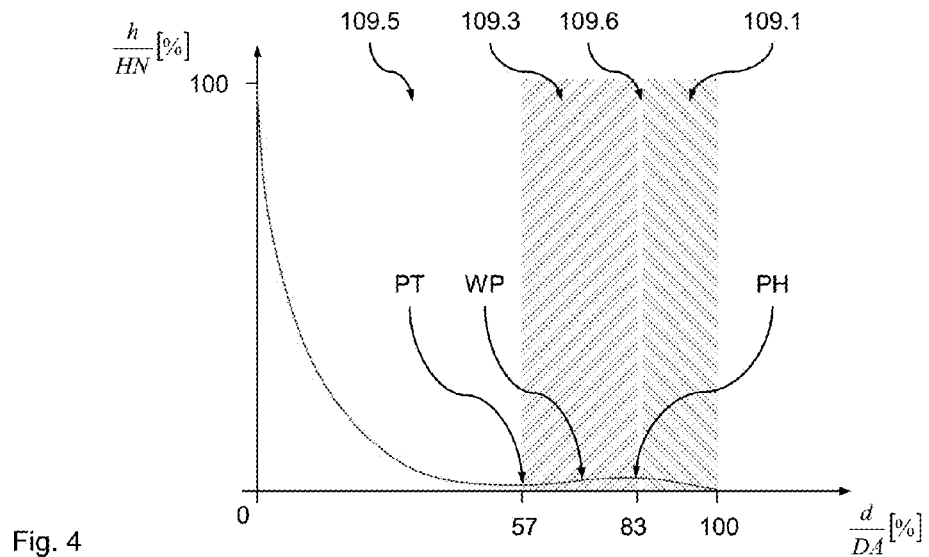
FIG. 4 shows the course of the z coordinate of the outer skin of the vehicle from FIG. 1 in the longitudinal centre plane (xz plane)

FIG. 4 illustrates the course of the height h of the sectional contour of the outer skin 102.1 (in relation to the nose tip height HN) above the construction limit envelope 112 in the vehicle longitudinal centre plane (sectional plane V-V from FIG. 3) in accordance with the spacing d from the free vehicle end 101.1 (in relation to the separation edge distance DA). The construction limit envelope 112 describes the envelope surface beyond which the wagon body 102 may not extend (with the vehicle 101 being located on straight, level track). That construction limit envelope 112 is generally predetermined by the routes to be travelled by the vehicle.

As can be seen in FIG. 4, the guiding portion 109.1, in the present example, extends in the vehicle longitudinal direction over approximately 15% of the separation edge distance DA in order to achieve a sufficiently strong or lasting influence on the air flow. However, it will be appreciated that the dimension of the guiding portion in the vehicle longitudinal direction, in principle, may be selected to be of any magnitude as long as a sufficiently strong or lasting influence on the flow is achieved, which influence ensures a correspondingly downwardly inclined main flow direction 111 after the flow separation edge 107.

Figure 5:
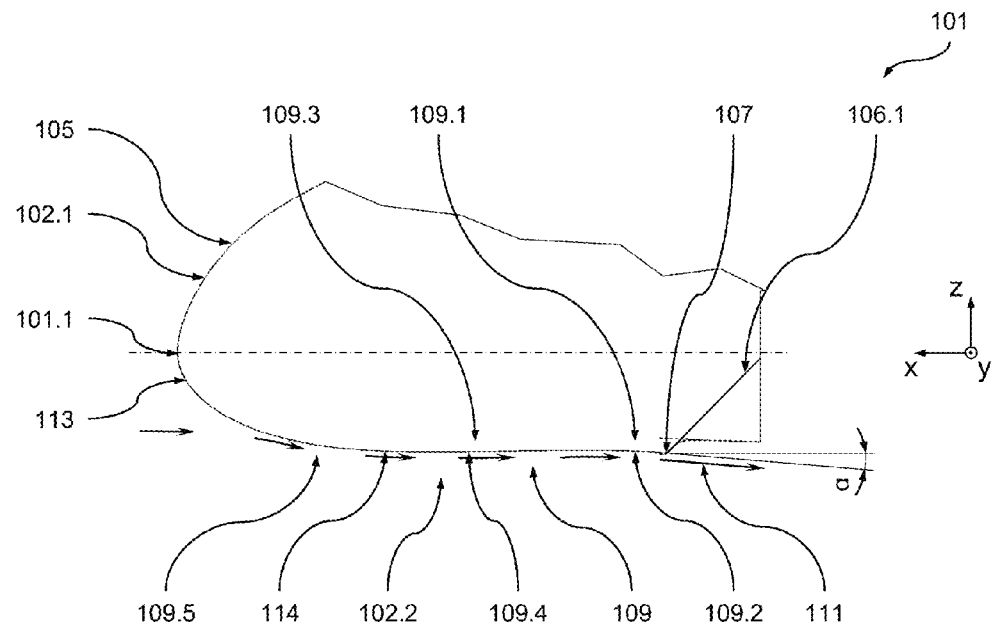
FIG. 5 is a schematic sectional view of a portion of the outer skin of the vehicle in the region of the vehicle front along line V-V from FIG. 3.
Figure 6:
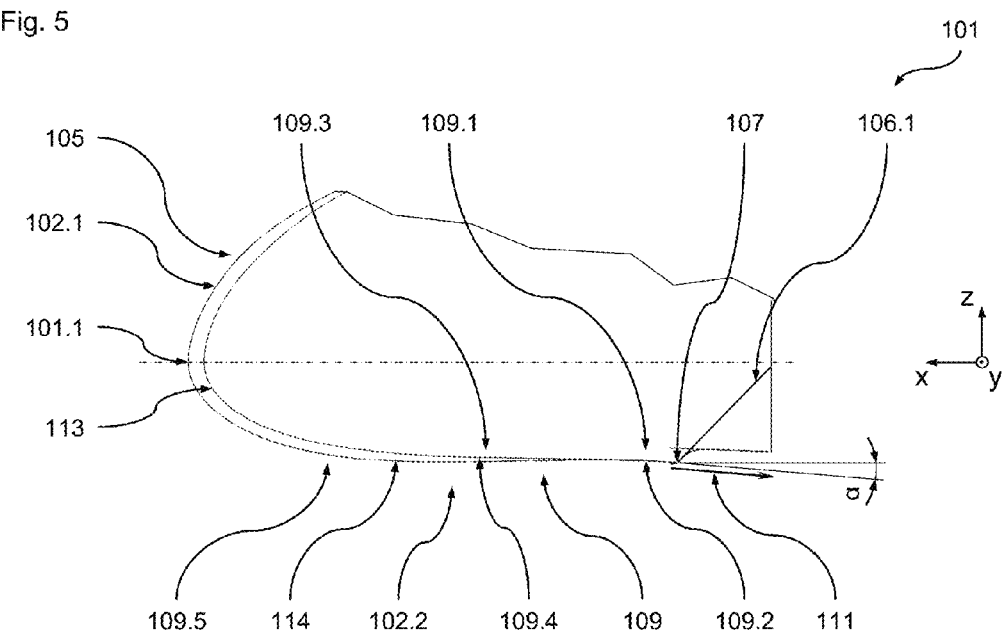
FIG. 6 is a schematic sectional view of a portion of the outer skin of the vehicle in the region of the vehicle front along line VI-VI from FIG. 3.
Figure 7:
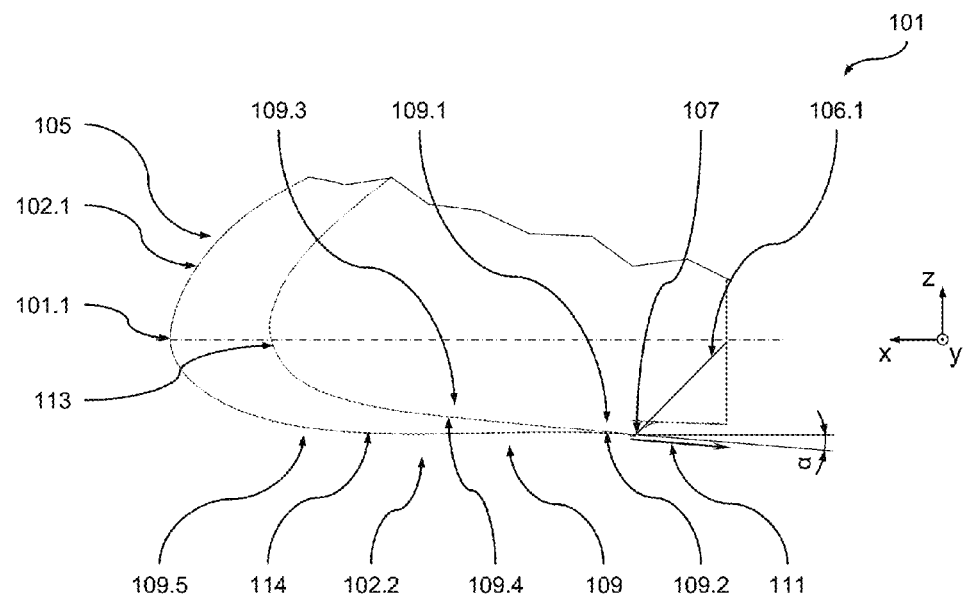
FIG. 7 is a schematic sectional view of a portion of the outer skin of the vehicle in the region of the vehicle front along line VII-VII from FIG. 3.
Figure 8:
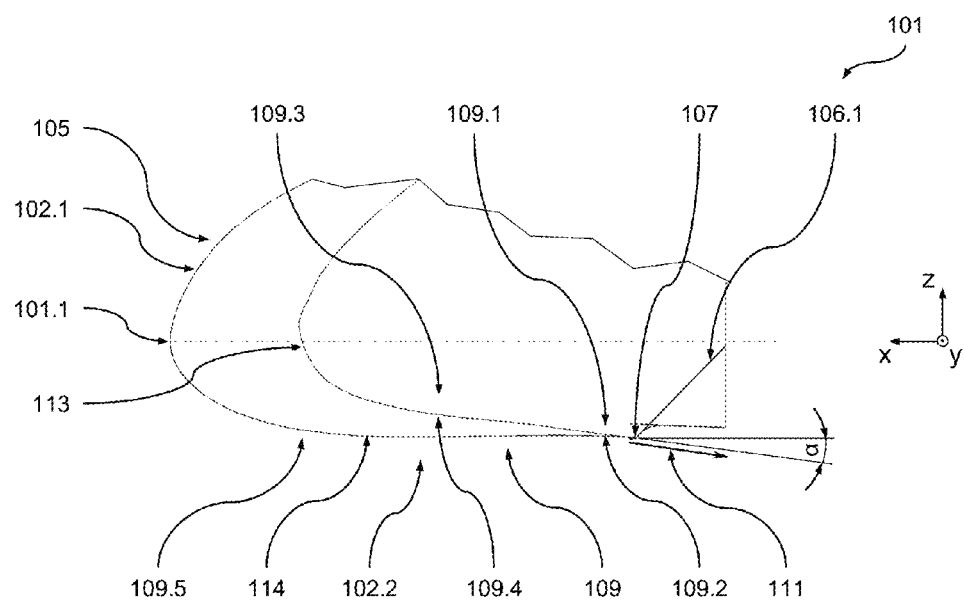
FIG. 8 is a schematic sectional view of a portion of the outer skin of the vehicle in the region of the vehicle front along line VIII-VIII from FIG. 3.

In the present example, the flow guiding surface 109.2 of the guiding portion 109.1 cooperating with the air flow is constructed as a substantially continuous smooth surface, the tangent to the flow guiding surface 109.2, in the sectional view from FIG. 5 at location 107, being inclined relative to the vehicle longitudinal direction by a first angle of inclination of $\alpha=6°$. In the present example, in the flow direction, the first angle of inclination α increases continuously towards the flow separation edge 107 from a value of $\alpha=3°$ (at the beginning of the guiding portion 109.1) because it is thereby possible to achieve a particularly favourable influence on the flow with the described, downwardly directed deflection of the main flow direction 111 by $\alpha=6°$.

In other preferred variants of the invention, the tangent to the flow guiding surface 109.2 is inclined relative to the vehicle longitudinal direction at 107, in the sectional view from FIG. 5, by a first angle of inclination $\alpha=9°$, angular deviations of up to $\pm 1°$ also being possible in this instance.

However, it will be understood that, in other variants, any other course of the angle of inclination over the guiding portion may also be provided. In particular, a progressive and/or degressive course of the angle of inclination may be provided at least partially. Additionally or alternatively, a constant angle of inclination may also be provided at least partially.

It will further be understood that the guiding portion does not necessarily have to have an uninterrupted smooth surface. Instead, the flow guiding surface may deviate to a greater or lesser extent from such a continuous and smooth surface, for example, may be provided (with regular or irregular distribution) with projections, indentations, local interruptions, etc. The decisive aspect is simply that the flow guiding surface is constructed in such a manner that it defines a corresponding envelope and involves the desired strong or lasting influence on the flow.

In other variants of the invention, the guiding surface, in principle, may have any course. Thus, for example, it may be constructed at least partially as a simple planar face having a linear sectional contour (in a plane perpendicular to the vehicle transverse direction). Additionally or alternatively, however, it may also have a construction which, at least section wise, is singularly or multiply curved.

As is apparent inter alia from the sections of the outer skin 102.1 illustrated in FIGS. 5 to 8 and 10 to 12 (see also FIG. 3 and FIG. 9), the flow guiding surface 109.2, in a sectional plane perpendicular to the vehicle longitudinal direction, has a substantially convex first sectional contour 113, whereas it has a substantially concave second sectional contour 113 in a sectional plane perpendicular to the vehicle transverse direction. Particularly favourable adaptation to the slender, elongate geometry of the vehicle front end is thereby achieved.

In order to laterally displace a portion of the incoming air that is as large as possible and, consequently, to prevent it from being introduced below the vehicle (where it can result in the acoustic problems described, since of the rugged configuration in the region of the bogie 103), the outer skin 102.1 at the vehicle lower side, in a dome-like portion 114 located upstream of the flow separation edge 107, is extended close up to the construction limit envelope 112. As can be seen in particular in FIG. 4, the lowest location PT of the outer skin 102.1, in the vehicle longitudinal direction, is located approximately centrally between the vehicle tip 101.1 and the flow separation edge 107, that is to say, at a distance from the vehicle tip 101.1, which is approximately 57% of the separation edge distance.

However, it will be understood that the dome-like portion may be arranged at a different distance from the vehicle tip or the flow separation edge in other variants of the invention, in particular in vehicles having a greater separation edge distance. In relation to the separation edge distance, the dome-like portion is then preferably located nearer the vehicle front in order to bring about early lateral displacement of the flow.

This configuration which is particularly advantageous in the case of high-speed traffic with the outer skin 102.1 extending as close as possible to the construction limit envelope 112 is combined in the present example in a particularly advantageous manner with the deflection of the air flow according to the invention in the region of the flow separation edge 107 in that the flow guiding device 109 has a diffuser portion 109.3 which is upstream of the guiding portion 109.1.

The diffuser portion 109.3 extends between the free vehicle end 101.1 and the guiding portion 109.1, it being constructed in such a manner that the free flow cross-section available in the vehicle height direction for the air flow (between the outer skin 102.1 and the track bed), starting from the lowest location PT, is increased in the flow direction (that is to say, towards the flow separation edge 107) in the manner of a diffuser.

That expansion of the flow cross-section obtained by means of the diffuser portion 109.3 allows the air flow which passes under the wagon body 102 to be initially directed upwards via the diffuser portion 109.3 in order subsequently to be able to direct it downwards again by means of the guiding portion 109.1 (see in particular FIG. 5), whereby the desired deflection of the main flow direction 111 and therefore the shear layer 108 is achieved in the region downstream of the flow separation edge 107.

It is thereby possible in the present example to extend both the outer skin 102.1 located at the vehicle front in front of the diffuser portion 109.3 and the flow separation edge 107 immediately (optionally even completely) up to the construction limit envelope 112 and, consequently, to reduce the air quantity which is even introduced into the region of the running gear cutout 106.

In order to achieve particularly effective lateral displacement, an introductory portion 109.5 of the flow guiding device 109 is located upstream of the diffuser portion 109.3, in the region of which introductory portion a tangent to the outer skin 102.1, in a sectional plane extending perpendicularly to the vehicle transverse direction, changes its inclination relative to the vehicle longitudinal direction continuously towards a value of zero.

The diffuser portion may also again have any suitable length as long as the above-described guiding function is achieved. In the present example, the diffuser portion 109.3, in the vehicle longitudinal direction, extends over 26% of the separation edge distance DA, since particularly advantageous guiding behaviour can thereby be achieved.

Similar applies to the introductory portion, which may have any suitable length and position in the vehicle longitudinal direction. In the present example, the introductory portion 109.5, in the vehicle longitudinal direction, extends as far as the lowest location PT and, therefore, up to a distance of 57% of the separation edge distance DA. In relation to the vehicle front height HN above the construction limit envelope 112, the introductory portion 109.5, in the vehicle longitudinal direction, extends up to a distance of 250% of the vehicle front height HN. In other words, a lateral displacement of the air flow advantageously already occurs very early in an advantageous manner with the nose of the vehicle 101 being drawn downwards to a large extent.

In the vehicle transverse direction, the dome-like portion 114 and the diffuser portion 109.3 extend centrally over approximately 30% of the wheel gauge W of the bogie 103, since a particularly advantageous configuration having a favourable early lateral displacement of the air flow is thereby achieved.

With regard to the construction of the diffuser surface 109.4 of the diffuser portion 109.3 co-operating with the air flow, in principle, the same statements as those made above for the guiding surface 109.2 apply. In particular, the diffuser portion may also again have at least partially a planar surface, a surface which is singularly curved, in particular a substantially cylindrical surface, or a surface which is curved twofold, in particular a substantially ellipsoid or hyperboloid surface.

In the present example, the diffuser surface 109.4 is constructed as a continuous, smooth surface, a tangent to the diffuser surface 109.4, in a sectional plane extending perpendicularly relative to the vehicle transverse direction (in particular in the vehicle longitudinal centre plane from FIG. 5), being inclined relative to the vehicle longitudinal direction by a second angle of inclination. The second angle of inclination increases from the value zero in the region of the lowest location PT continuously at first to a value of 5° until it again decreases after a point of inflection WP to the value zero which it reaches at a highest location PH. In the present example, the highest location PH of the diffuser portion 109.3 is located at a distance from the vehicle tip 101.1 of approximately 83% of the separation edge distance DA, whilst the point of inflection WP is located approximately centrally between the lowest location PT and the highest location PH.

In the present example, a configuration which is advantageous with regard to the unimpeded guiding of the air flow and the simple integration into the geometry of the vehicle front end is achieved in that the diffuser surface 109.4 has a substantially convex sectional contour 113 in a sectional plane perpendicular to the vehicle longitudinal direction (see FIGS. 11 and 12) and has the described sectional contour with the point of inflection WP in a sectional plane perpendicular to the vehicle transverse direction.

There is provided between the diffuser portion 109.3 and the guiding portion 109.1 a transition portion 109.6, in the region of which the tangent to the outer skin 109.2, in a sectional plane extending perpendicularly relative to the vehicle transverse direction, continuously changes its inclination relative to the vehicle longitudinal direction starting from the value zero and, consequently, ensures an unimpeded transition between the diffuser portion 109.3 and the guiding portion 109.1.

In general, consequently, a slight indentation in the outer skin 102.1 is produced by the diffuser portion 109.3, the transition portion 109.6 and the guiding portion 109.1 so as to have a substantially S-like sectional contour, by means of which the described downward deflection of the main flow direction 111 can be achieved in spite of extending the dome-like portion 114 up to the construction limit envelope 112.

Furthermore, 17 turbulator elements 115 are arranged at each of the two sides of the longitudinal centre plane in the region of the flow separation edge. Those turbulator elements 115 serve to introduce vortices into the shear layer 108 formed after the flow separation at the flow separation edge 107. The advantage described in the introduction involving the prevention of noise emissions caused by vortices periodically forming within the shear layer 108 is thereby achieved.

As can be seen in particular in FIGS. 9 to 12, each turbulator element 115 is in the form of a short fin-like projection at the lower side of the outer skin 102.1, the lower edge of which extends up to the construction limit face 112. The turbulator element 115 is arranged so as to be inclined relative to the vehicle longitudinal direction and the vehicle transverse direction. This has the advantage that the disruption introduced into the shear layer 108 can act primarily in the vehicle transverse direction or in the main extension plane of the shear layer 108 which contains the main flow direction 111. Accordingly, the turbulator elements 115 do not cause an undesirable, increased expansion of the shear layer 108 in a vehicle height direction or perpendicularly relative to the main extension plane of the shear layer 108.

The turbulator elements 115 are arranged in such a manner that they direct the portion of the air flow striking them away from the longitudinal centre plane of the wagon body in the vehicle transverse direction, since a particularly favourable introduction of the turbulence into the shear layer 108 is thereby achieved. The length of the turbulator elements 115 is selected so that, in the vehicle transverse direction or within the main extension plane of the shear layer, they bring about a sufficiently strong deflection of the portion of the air flow striking them, which results in sufficient fine turbulence in the shear layer 108 without further substantially expanding the latter transversely relative to the main extension plane thereof.

It will be understood that, in principle, in other variants of the invention, the turbulator elements can be constructed in any other suitable manner. In particular, the turbulator elements may have any suitable orientation relative to the vehicle longitudinal direction as long as they result in the described sufficient fine turbulence in the shear layer in the main extension plane thereof.

It should again be noted at this point that an arrangement of the turbulator element which is inclined in such a manner relative to the main flow direction and which induces fine turbulence in the shear layer without any substantial expansion of the shear layer transversely relative to the main extension plane thereof constitutes an independently patentable inventive concept which is independent of the deflection of the shear layer downwards.

The present invention has been described above with reference to an example in which the head module as a complete component integrates the flow guiding device according to the invention. However, it will be understood that, in other variants of the invention, the wagon body module according to the invention may be constructed as a separate module which can also be mounted to an existing wagon body subsequently, as indicated by the dashed contour 116 in FIG. 9. In this case, it is particularly suitable as a retrofit component for already existing vehicles which currently have a conventional configuration having a lower side of the wagon body extending parallel to the vehicle longitudinal axis.

The present invention has been described above with reference to an example in which the flow guiding device according to the invention is arranged on the leading running gear. However, it will be understood that, in other variants of the invention, additionally or alternatively, the flow guiding device according to the invention may naturally also be provided in the region of other running gears. It will further be understood that the flow guiding device according to the invention may naturally also be provided at both sides of the relevant running gear.

The present invention has been described above exclusively for examples of vehicles for train sets. However, it will be understood that the invention may also be used in conjunction with other rail vehicles. Furthermore, the invention has been described only in connection with rail vehicles. However, it will be understood that it may also be used in connection with any other vehicles in order to reduce noise emissions, to reduce the flow resistance and to reduce the aerodynamic loads on the track.

The invention claimed is:

1. A wagon body module for forming at least a portion of a head portion of a wagon body of a vehicle supported on at least one running gear, comprising:
 a flow guiding surface,
 said wagon body defining a vehicle longitudinal direction, a vehicle transverse direction and a vehicle height direction,
 said head portion being configured to form a leading free vehicle end during normal operation of said vehicle,
 said flow guiding surface being configured to be arranged, at a lower side of said wagon body, in said vehicle longitudinal direction between said free vehicle end and a leading end of a running gear cutout of said wagon body, the cutout receiving said running gear associated with said free vehicle end, and
 said flow guiding surface being configured to influence, during operation of said vehicle, an air flow which flows over said lower side of said wagon body from said free vehicle end towards said running gear cutout,
 wherein
 said flow guiding surface extends downwardly up to said leading end of said running gear cutout of said wagon body,
 said flow guiding surface is configured to impose to said air flow in a region of a flow separation edge at said leading end of said running gear cutout, by means of a deflection region, a downwardly directed main flow direction which is inclined relative to said vehicle longitudinal direction by at least 3°
 said flow separation edge is arranged so as to be spaced from said free vehicle end in said vehicle longitudinal direction by a separation edge distance,
 said flow guiding surface cooperates with said air flow and defines an envelope, and
 said flow guiding surface has a guiding portion adjoining said flow separation edge, extending between said free vehicle end and said flow separation edge and reducing, in said vehicle height direction, a free flow cross-section available for said air flow towards said flow separation edge,
 said guiding portion in said vehicle longitudinal direction extending over at least 10% of said separation edge distance, and/or
 said guiding portion has a guiding surface cooperating with said air flow, a tangent to said envelope in the region of said guiding surface, in a sectional plane extending perpendicularly to said vehicle transverse direction, being inclined relative to said vehicle longitudinal direction by at least a first angle of inclination of at least 3°, said first angle of inclination increasing in said direction towards said flow separation edge, and/or said guiding portion extending in said vehicle transverse direction over at least 80%, of a wheel gauge of said running gear, and said flow guiding surface has a diffuser portion located upstream of said guiding portion, extending between said free vehicle end and said guiding portion and increasing, in said vehicle height direction, a free flow cross-section available for said air flow towards said flow separation edge, wherein said diffuser portion is configured to allow said air flow that passes under said wagon body to be initially directed upwards so as to allow said diffuser portion to direct said air flow downwardly using said guiding portion.

2. The wagon body module according to claim 1, wherein:
said main flow direction is inclined relative to said vehicle longitudinal direction by 3° to 30°, and/or
said deflection region, in said vehicle transverse direction, extends over at least 60%, of a wheel gauge of said running gear.

3. The wagon body module according to claim 1, wherein:
said guiding portion forms said flow separation edge, said flow separation edge being constructed in a substantially linear manner, and/or
said guiding portion has a substantially smooth guiding surface, and/or
said guiding portion has a guiding surface which is at least singularly curved, and/or
said guiding portion has a substantially cylindrical guiding surface or a substantially ellipsoid guiding surface or a substantially hyperboloid guiding surface, and/or
said guiding portion has a guiding surface which has a substantially convex first sectional contour in a sectional plane perpendicular to said vehicle longitudinal direction and has a substantially concave second sectional contour in a sectional plane perpendicular to said vehicle transverse direction.

4. The wagon body module according to claim 1, wherein:
said diffuser portion extending, in said vehicle longitudinal direction, over at least 15% of said separation edge distance, and/or
said diffuser portion having a diffuser surface cooperating with said air flow, a tangent to said envelope, in said region of said diffuser surface, in a sectional plane extending perpendicularly to said vehicle transverse direction, being inclined relative to said vehicle longitudinal direction by a first angle of inclination of at least 1°, and/or
said diffuser portion extending, in said vehicle transverse direction, over at least 20%, of a wheel gauge of said running gear.

5. The wagon body module according to claim 4, wherein:
said diffuser portion has a substantially smooth surface, and/or
said diffuser portion has a surface which is at least singularly curved, or a surface which is curved twice, and/or
said diffuser portion has a diffuser surface having a substantially convex third sectional contour in a sectional plane perpendicular to said vehicle longitudinal direction and having a fourth sectional contour having a point of inflection in a sectional plane perpendicular to said vehicle transverse direction.

6. The wagon body module according to claim 4, wherein:
a transition portion of said flow guiding surface is provided between said diffuser portion and said guiding portion, in the area of said transition portion, a tangent to said envelope, in a sectional plane extending perpendicularly to said vehicle transverse direction, changing, its inclination relative to said vehicle longitudinal direction, and/or an introductory portion of said flow guiding surface located upstream of said diffuser portion is provided, in the area of said introductory portion, a tangent to said envelope, in a sectional plane extending perpendicularly to said vehicle transverse direction, changing, its inclination relative to said vehicle longitudinal direction towards a value of zero, and/or a construction limit envelope which said wagon body has to comply with is predetermined for said wagon body, an introductory portion of said flow guiding surface being provided upstream of said diffuser portion and, at least in said vehicle height direction, extending substantially up to said construction limit envelope.

7. The wagon body module according to claim 1, wherein:
said flow guiding surface is constructed in order to form a slight indentation in an outer skin of said wagon body at said lower side of said wagon body between an introductory portion located upstream of said flow separation edge and said flow separation edge,
said flow guiding surface having a flow guiding surface cooperating with said air flow and defining an envelope, and
said envelope, in a sectional plane extending perpendicularly to said vehicle transverse direction, having a substantially S-shaped sectional contour over a transverse region.

8. The wagon body module according to claim 7, wherein:
said transverse region extends in said vehicle transverse direction over at least 50%, of a wheel gauge of said running gear, and/or
said flow separation edge, in said vehicle longitudinal direction, is arranged so as to be spaced from said free vehicle end by a separation edge distance, said introductory portion extending, in said vehicle longitudinal direction, up to a distance from said free vehicle end of 35% to 65% of said separation edge distance, and/or
a construction limit envelope which said wagon body has to comply with is predetermined for said wagon body, said free vehicle end, in said vehicle height direction, having a vehicle front height above said construction limit envelope, said introductory portion, in said vehicle longitudinal direction, extending up to a distance from said free vehicle end of 150% to 300% of said vehicle front height.

9. The wagon body module according to claim 7, wherein:
a construction limit envelope which said wagon body has to comply with is predetermined for said wagon body, said introductory portion, at least in said vehicle height direction, extending substantially up to said construction limit envelope, and/or
said introductory portion is constructed in the area of a substantially dome-shaped projection at said lower side of said wagon body.

10. The wagon body module according to claim 1, wherein:
said flow separation edge is constructed in a substantially linear manner, and/or
a construction limit envelope which said wagon body has to comply with is predetermined for said wagon body, said flow separation edge, at least in said vehicle height direction, extending substantially up to said construction limit envelope.

11. The wagon body module according to claim 1, wherein:

in said region of said flow separation edge, a plurality of turbulator elements are provided for introducing turbulence into a shear layer forming after flow separation at said flow separation edge, at least one of said turbulator elements being constructed as a fin-shaped projection at said lower side of said wagon body, which is arranged so as to be inclined relative to said vehicle longitudinal direction, and/or, at least one of said turbulator elements being configured to divert a portion of said air flow striking it in said vehicle transverse direction away from a longitudinal centre plane of said wagon body.

12. A wagon body having a wagon body module according to claim 1.

13. A wagon body for a vehicle, comprising:
a head portion,
a running gear cutout for receiving a running gear associated with said head portion and
a flow guiding surface,
said head portion defining a vehicle longitudinal direction, a vehicle transverse direction and a vehicle height direction,
said head portion being configured to form a leading free vehicle end during normal operation at a nominal operating speed of said vehicle,
said running gear cutout having a leading end located nearer said free vehicle end in said vehicle longitudinal direction than a trailing end of said running gear cutout,
said flow guiding surface being arranged, at a lower side of said wagon body, between said free vehicle end and said leading end of said running gear cutout, and
said flow guiding surface being configured to influence, during operation of said vehicle, an air flow which flows over said lower side of said wagon body from said free vehicle end towards said running gear cutout,
wherein
said flow guiding surface is configured to impose, by means of a deflection region, a downwardly directed main flow direction to said air flow in said region of a flow separation edge located at said leading end of said running gear cutout,
said main flow direction being inclined downwards in such a manner that a shear layer forms after flow separation at said flow separation edge, a height of said shear layer increasing along said flow path by an expansion in said vehicle height direction,
strikes said running gear over a maximum of 40% of said height of said shear layer, and/or
strikes said trailing end of said running gear cutout over a maximum of 40% of said height of said shear layer, and
said flow separation edge is arranged so as to be spaced from said free vehicle end in said vehicle longitudinal direction by a separation edge distance,
said flow guiding surface cooperates with said air flow and defines an envelope, and
said flow guiding surface has a guiding portion adjoining said flow separation edge, extending between said free vehicle end and said flow separation edge and reducing, in said vehicle height direction, a free flow cross-section available for said air flow towards said flow separation edge,
said guiding portion in said vehicle longitudinal direction extending over at least 10% of said separation edge distance, and/or
said guiding portion has a guiding surface cooperating with said air flow, a tangent to said envelope in the region of said guiding surface, in a sectional plane extending perpendicularly to said vehicle transverse direction, being inclined relative to said vehicle longitudinal direction by at least a first angle of inclination of at least 3°, said first angle of inclination increasing in said direction towards said flow separation edge, and/or said guiding portion extending in said vehicle transverse direction over at least 80%, of a wheel gauge of said running gear, and said flow guiding surface has a diffuser portion which is located upstream of said guiding portion, which extends between said free vehicle end and said guiding portion and which increases, in said vehicle height direction, a free flow cross-section available for said air flow towards said flow separation edge, wherein said diffuser portion is configured to allow said air flow that passes under said wagon body to be initially directed upwards so as to allow said flow guiding surface to direct said air flow downwardly using said guiding portion.

14. A vehicle having a wagon body according to claim 12, wherein it is a vehicle for high-speed traffic having a nominal operating speed above 250 km/h.

15. A wagon body module for forming at least a part of a head portion of a wagon body of a vehicle supported on at least one running gear, comprising:
a flow guiding surface,
wherein
said wagon body defines a vehicle longitudinal direction, a vehicle transverse direction, and a vehicle height direction,
said head portion is configured to form a leading free vehicle end during normal operation of said vehicle,
said flow guiding surface is configured to be arranged, at a lower side of said wagon body and in said vehicle longitudinal direction, between said free vehicle end and a leading end of a running gear cutout of said wagon body, said cutout receiving said running gear associated with said free vehicle end, and
said flow guiding surface is configured to influence, during operation of said vehicle, an air flow which flows over said lower side of said wagon body from said free vehicle end towards said running gear cutout,
wherein
said flow guiding surface extends downwardly up to said leading end of said running gear cutout,
said flow guiding surface has a deflection region which is configured to impose to said air flow, in a region of a flow separation edge at said leading end of said running gear cutout, a downwardly directed main flow direction which is inclined relative to said vehicle longitudinal direction by at least 3°,
said flow guiding surface has a guiding portion, which adjoins said flow separation edge, which extends between said free vehicle end and said flow separation edge and which reduces, in said vehicle height direction, a free flow cross-section available for said air flow towards said flow separation edge, and
said flow guiding surface has a diffuser portion which is located upstream of said guiding portion, which extends between said free vehicle end and said guiding portion and which increases, in said vehicle height direction, a free flow cross-section available for said air flow towards said flow separation edge, wherein said diffuser portion is configured to allow said air flow that passes under said wagon body to be initially directed upwards so as to allow said flow guiding surface to direct said air flow downwardly using said guiding portion.

16. The wagon body module of claim 15, wherein
said flow separation edge is spaced from said free vehicle end in said vehicle longitudinal direction by a separation edge distance, and
said guiding portion, in said vehicle longitudinal direction, extends over at least 10% of said separation edge distance.

17. The wagon body module of claim 15, wherein
said flow guiding surface cooperates with said air flow and defines an envelope, and
said guiding portion has a guiding portion surface cooperating with said air flow, a tangent to said envelope in a region of said flow separation edge, in a sectional plane extending perpendicularly to said vehicle transverse direction, is inclined relative to said vehicle longitudinal direction by an angle of inclination of at least 3°.

18. The wagon body module of claim 16, wherein an angle of inclination of said tangent to said envelope increases in said direction towards said flow separation edge.

19. The wagon body module of claim 15, wherein said guiding portion, in said vehicle transverse direction, extends over at least 80% of a wheel gauge of said running gear.

* * * * *